United States Patent
Kim et al.

(10) Patent No.: US 8,530,109 B2
(45) Date of Patent: *Sep. 10, 2013

(54) ANION EXCHANGE POLYMER ELECTROLYTES

(75) Inventors: Yu Seung Kim, Los Alamos, NM (US); Dae Sik Kim, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/186,214

(22) Filed: Jul. 19, 2011

(65) Prior Publication Data

US 2011/0275008 A1 Nov. 10, 2011

Related U.S. Application Data

(63) Continuation-in-part of application No. 12/878,844, filed on Sep. 9, 2010.

(60) Provisional application No. 61/242,247, filed on Sep. 14, 2009.

(51) Int. Cl.
*H01M 8/10* (2006.01)

(52) U.S. Cl.
USPC ............................ 429/483; 521/25; 528/128

(58) Field of Classification Search
USPC ........................... 429/483; 521/25; 528/125
See application file for complete search history.

(56) References Cited

U.S. PATENT DOCUMENTS

| | | | |
|---|---|---|---|
| 7,439,275 B2 | 10/2008 | Pivovar et al. | |
| 7,582,683 B2 | 9/2009 | Pivovar et al. | |
| 7,846,980 B2 | 12/2010 | Pivovar et al. | |
| 2006/0217526 A1* | 9/2006 | Pivovar et al. | 528/373 |

OTHER PUBLICATIONS

Neagu et al., "Ionic Polymers VI. Chemical Stability of Strong Base Anion Exchangers in Aggressive Media," Polymer Degradation and Stability, vol. 70, Dec. 2000, pp. 463-468.
Varcoe et al., "Prospects for Alkaline Anion-Exchange Membranes in Low Temperature Fuel Cells," Fuel Cells, vol. 4, No. 4.

* cited by examiner

*Primary Examiner* — Shane Fang
(74) *Attorney, Agent, or Firm* — Samuel L. Borkowsky

(57) ABSTRACT

Solid anion exchange polymer electrolytes include chemical compounds comprising a polymer backbone with side chains that include guanidinium cations.

16 Claims, 1 Drawing Sheet

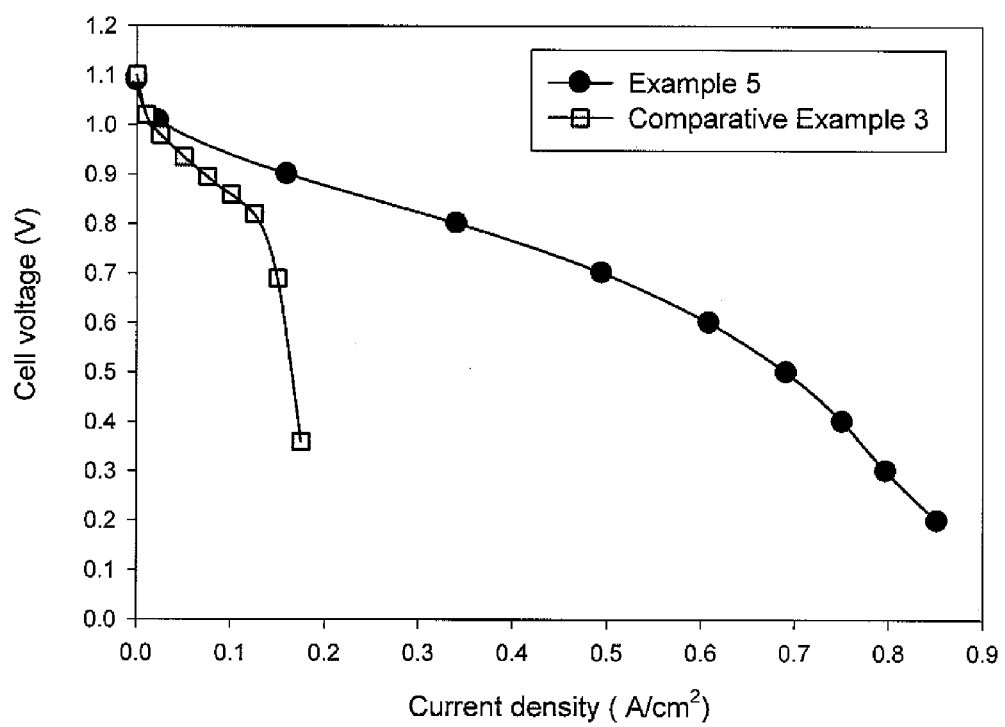

ANION EXCHANGE POLYMER ELECTROLYTES

REFERENCE TO PRIOR APPLICATIONS

This application is a continuation-in-part of U.S. patent application Ser. No. 12/878,844 entitled "Anion Exchange Polymer Electrolytes," filed Sep. 9, 2010, which claims the benefit of priority of U.S. Patent Application 61/242,247, filed Sep. 14, 2009, both incorporated herein in their entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to anion exchange polymer electrolytes comprising guanidinium, and to liquid compositions and membranes for fuel cells comprising same.

BACKGROUND OF THE INVENTION

Ion exchange polymer electrolytes and their dispersion in a liquid medium are an essential part of fuel cells and other electrochemical applications. In fuel cells, electrochemical reactions occur either in acidic or alkaline media. In acidic environments, proton exchange membranes offer the required combination of adequate longevity and good conductivity at relatively low temperatures (25-100° C.). Whereas fuel cells and electrolytes employ proton exchange membranes, alkaline fuel cells require anion-conducting electrolytes. In alkaline environments, the efficiency of the oxygen reduction reaction is much higher than in acidic conditions, which allows the use of low-cost, abundant electrocatalysts as opposed to precious metal catalysts.

Traditionally, alkaline fuel cells use an aqueous solution of potassium hydroxide as the electrolyte, with typical concentrations of about 30%. A major operating constraint is the requirement for low carbon dioxide concentrations in the oxidant feed stream, as carbon dioxide can result in the formation of carbonate precipitates. One approach for addressing this issue is the use of solid anion-conducting polymer electrolytes as membranes and ionomers at the fuel cell electrode. Alkaline fuel cell systems based on such membranes and ionomers utilize the desirable properties of the solid electrolytes, such as the lack of requirement of liquid electrolyte circulation, less corrosion, and the capability of applying differential pressure and system design simplification.

A significant challenge in the area of alkaline fuel cells is the current lack of anion exchange polymer electrolytes that have i) good electrolyte stability in alkaline media, ii) high anionic conductivity, and iii) good processability. In addition, high permeability of reactant gas and water for the ionomer at the fuel cell electrode has not been acquired from current anion exchange polymer electrolytes.

Without wishing to be limited by theory, the low stability of anion exchange polymer electrolytes is due to fast hydrolysis of polymer electrolytes under high pH conditions. The degradation process can be accelerated by electron-withdrawing molecules in the vicinity of cation functional group. The stability of anion exchange polymer electrolytes can be improved by incorporating bulky cations such as sulfonium, phosphazenium, and guanidinium instead of conventional tetraalkylammonium.

Recent research efforts to incorporate the bulky cations into polymer structure have been mostly limited to hydrocarbon-based polymers. While the improved stability of bulky cation incorporated hydrocarbon-based polymers over tetraalkylammonium functionalized polymers is probably the most desirable property, technical challenges related to conductivity, processibility and gas permeability still remained as major issues.

Fluorinated polymers in general have higher gas permeability than hydrocarbon-based polymers since fluorinated polymers have hydrophobicity and higher oxygen solubility than hydrocarbon-based polymer. In alkaline fuel cells, water is generated and consumed at the anode and cathode, respectively. Thus large amount of liquid water exist in the anode but additional water may need to be supplied in the cathode for the reaction. While high content of water at both electrodes is beneficial to decrease ohmic resistance of the cell, the reactant gas permeability for both electrodes can be significantly reduced in the presence of liquid water due to the flooding. Hydrophobicity and high oxygen solubility of fluorinated polymers increase gas permeability and improve the water removal ability from electrodes which is beneficial to the cell performance.

Fluorinated polymer electrolytes have higher conductivity than hydrocarbon-based polymer electrolytes at a given anion or cation concentration since hydrocarbon-based polymers have relatively lower density and thus greater inter-ionic distance than fluorinated polymers. In general, ionic conductivity can also be increased by increasing anion or cation concentration but incorporating high concentration of ionic functional group is often technically challenging to synthesize. Furthermore, polymer electrolytes with high ion concentration generally absorb excessive water which weakens their mechanical properties. High conductivity of polymer electrolytes is especially beneficial to alkaline membrane fuel cells since hydroxide conductivity in alkaline membrane fuel cells is significantly lower than proton conductivity in proton exchange membrane fuel cells due to the slower diffusion coefficient of the hydroxide ion and the larger size of cation group in the anion exchange polymer electrolytes, which dilutes the concentration of ion exchange site.

Solution or dispersion of anion exchange polymer electrolytes in a liquid medium is critical requirement for electrode processing. The limited solubility has been a significant inhibitor of successful application of alkaline fuel cells. Alkyl ammonium cation-based (and other cation-based) anion exchange polymer electrolytes may be synthesized by chloride substitution of a —$CH_2Cl$ moiety of the polymers. Because the cation form of the polymer electrolytes is directly synthesized via chloride substitution, the resultant cation functionalized polymer electrolytes has limited solubility.

Prior efforts to synthesize fluorinated anion exchange polymer electrolytes have not produced stable and practical polymer electrolytes. In addition, the stability of fluorinated polymer electrolytes comprising the directly-attached highly bulky cations is questionable since electron withdrawing characteristics of fluorine tend to weaken the stability of the bulk cations. There exists a need, therefore, for fluorinated anion conducting polymer electrolytes that are stable to chemical degradation at high pH, that have high anionic conductivity, and that have better processibility. Additionally, a need exists for methods of fabrication of high performance solid anion exchange membrane fuel cells which comprise the aforementioned anion conducting polymer electrolytes.

SUMMARY OF THE INVENTION

The present invention meets the aforementioned needs by providing anion exchange polymer electrolytes. These materials have a fluorinated polymeric backbone with side chains that include positively charged terminal guanidinium chemical groups. The side chains also include cation-stabilizing spacers. Each spacer attaches a guanidinium chemical group to the polymer backbone in some embodiments, and in other embodiments the spacer attaches the guanidinium chemical group to the rest of the side chain. This arrangement allows for desirable fluorination of the polymer while counteracting the destabilizing electron-withdrawing capability of the fluorine atoms. The following describe some nonlimiting embodiments of the present invention.

According to an embodiment of the present invention, a core structure of solid anion exchange polymer electrolytes is provided of the formula:

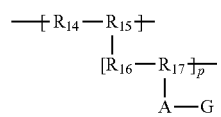

wherein
i) p=1-100;
ii) $R_{14}$=$CF_2$ and $R_{15}$=CF; or $R_{14}$=$CF_2$ and $R_{15}$=CH; or $R_{14}$=$CH_2$ and $R_{15}$=CF; or $R_{14}$=CHF and $R_{15}$=CF; or $R_{14}$=CHF and $R_{15}$=CH;
iii) $R_{16}$ is $CH_2$ or $CF_2$ or CHF;
iv) $R_{17}$ is CH or CF;
v) A is a spacer selected from —O—, —S—, —$SO_2$—, —NH—, —N($CH_3$)—, —($CH_2$)$_n$— wherein n=1-10,

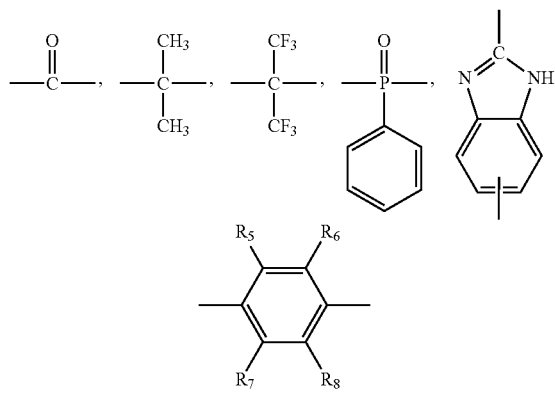

wherein $R_5$, $R_6$, $R_7$ and $R_8$ each are independently selected from —H, —$NH_2$, —F, —Cl, —Br, —CN, or a $C_1$-$C_6$ alkyl group;
vi) A is a spacer selected from any combination of the molecule listed above from v such as —$SO_2$—Ar—, —C(=O)Ar—, —$SO_2$—NH—, —C(=O)NH—Ar—, —C(=O)N($CH_3$)—Ar—, —$SO_2$—NH—$SO_2$—.
vii) G is

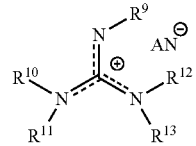

wherein $R_9$, $R_{10}$, $R_{11}$, $R_{12}$, and $R_{13}$ are each independently are selected from —H, —$CH_3$, —$NH_2$, —N(=O), —$NO_2$, —CN, —(CH)$_n$$CH_3$ wherein n=1-6, HC(=O)—, $CH_3$C(=O)—, $NH_2$C(=O)—, —($CH_2$)$_n$COOH wherein n=1-6, —($CH_2$)$_n$C($NH_2$)COOH wherein n=1-6, —CH(COOH)$CH_2$COOH, —$CH_2$CH(O—$CH_2$$CH_3$)$_2$, —C(=S)$NH_2$, —C(=NH)N(($CH_2$)$_{n1}$$CH_3$)(($CH_2$)$_{n2}$$CH_3$) wherein $n_1$=0-6 and $n_2$=0-6, —NHC(=S)SH, —$CH_2$C(=O)OC($CH_3$)$_3$, —O($CH_2$)$_n$CH($NH_2$)COOH wherein n=1-6, —($CH_2$)$_n$CH=$CH_2$ wherein n=1-6, —($CH_2$)$_n$$CH_2$CN where n=1-6, an aromatic group such as phenyl, benzyl, phenoxy, methylbenzyl, nitrogen-substituted benzyl, nitrogen-substituted phenyl, halide, or a halide-substituted methyl group; where in AN is counter anion selected from $OH^-$, $CO_3^{2-}$, $HCO_3^-$, $F^-$, $Cl^-$, $Br^-$, $I^-$, $IO_3^-$, $SO_4^{2-}$, $HSO_3^-$, $H_2PO_4^-$, $NO_3^-$, and $CH_3OSO_3^-$.

According to yet another embodiment of the present invention, a solid anion exchange polymer electrolyte is provided, comprising:

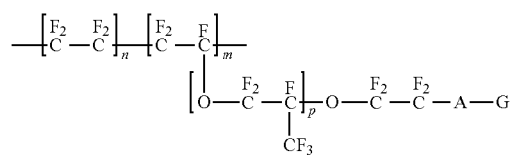

wherein
i) n and m are from 1-50 and p=0-10;
ii) A is a spacer selected from —O—, —S—, —$SO_2$—, —NH—, —N($CH_3$)—, —($CH_2$)$_n$— wherein n=1-10,

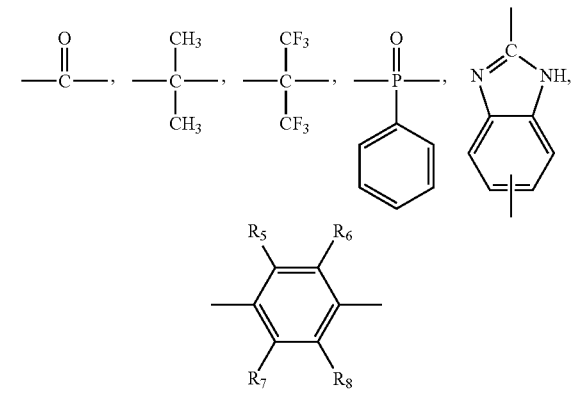

wherein $R_5$, $R_6$, $R_7$ and $R_8$ each are independently —H, —$NH_2$, —F, —Cl, —Br, —CN, a $C_1$-$C_6$ alkyl group;
iii) A is a spacer selected from any combination from ii) such as, but not limited to, —$SO_2$Ar—, —C(=O)Ar—, —$SO_2$NH—, —C(=O)NH—Ar—, —C(=O)N($CH_3$)—Ar—, —$SO_2$NH$SO_2$—.
iv) G is

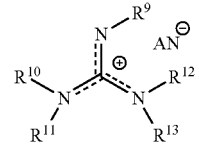

wherein $R_9$, $R_{10}$, $R_{11}$, $R_{12}$, and $R_{13}$ are each independently selected from —H, —$CH_3$, —$NH_2$, —N(=O), —$NO_2$, —CN, —(CH)$_n$CH$_3$ wherein n=1-6, HC(=O)—, CH$_3$C(=O)—, NH$_2$C(=O)—, —(CH$_2$)$_n$COOH wherein n=1-6, —(CH$_2$)$_n$C(NH$_2$)COOH where n=1-6, —CH(COOH)CH$_2$COOH, —CH$_2$CH(OCH$_2$CH$_3$)$_2$, —C(=S)—NH$_2$, C(=NH)N((CH$_2$)$_{n1}$CH$_3$)((CH$_2$)$_{n2}$CH$_3$) wherein n$_1$ is 0-6 and n$_2$=0-6, —NHC(=S)SH, —CH$_2$C(=O)OC(CH$_3$)$_3$, —O(CH$_2$)$_n$CH(NH$_2$)COOH, wherein n=1-6, —(CH$_2$)$_n$CH=CH wherein n=1-6, —(CH$_2$)$_n$CH$_2$CN wherein n=1-6, an aromatic group such as phenyl, benzyl, phenoxy, methylbenzyl, nitrogen-substituted benzyl, nitrogen substituted phenyl, a halide, or a halide-substituted methyl group; wherein in AN is counter anion selected from OH$^-$, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$, CH$_3$OSO$_3^-$.

According to yet another embodiment of the present invention, a composition comprising a chemical compound is provided, said chemical compound comprising a polymer that includes guanidinium cations that are attached to the polymer with spacers A. The spacers may, for example, attach the guanidiniums to the polymer backbone. The spacers may also attach the guanidiniums to side chains. In this case, the guanidiniums are also part of the side chains. The chemical compound is uniformly dispersed in a suitable solvent. The compound may be represented by the formula

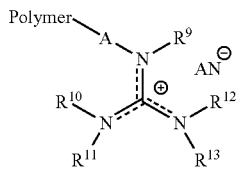

wherein:
i) A is a spacer selected from —O—, —S—, —SO$_2$—, —NH—, —N(CH$_3$)—, —(CH$_2$)— wherein n=1-10,

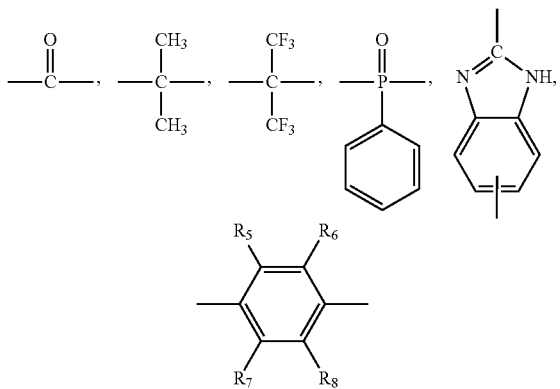

wherein R$_5$, R$_6$, R$_7$ and R$_8$ each are independently selected from —H, —NH$_2$, —F, —Cl, —Br, —CN, a C$_1$-C$_6$ alkyl group, or any combination of thereof such as —SO$_2$Ar—, —C(=O)Ar—, —SO$_2$NH—, —C(=O)NHAr—, —C(=O)N(CH$_3$)Ar—, —SO$_2$NHSO$_2$—;

ii) R$_9$, R$_{10}$, R$_{11}$, R$_{12}$, and R$_{13}$ are each independently selected from —H, —CH$_3$, —NH$_2$, —N(=O), —NO$_2$, —CN, —(CH)$_n$CH$_3$ wherein n=1-6, HC(=O)—, CH$_3$C(=O)—, NH$_2$C(=O)—, —(CH$_2$)$_n$COOH wherein n=1-6, —(CH$_2$)$_n$C(NH$_2$)COOH wherein n=1-6, —CH(COOH)CH$_2$COOH, —CH$_2$CH(OCH$_2$CH$_3$)$_2$, —C(=S)NH$_2$, C(=NH)N((CH$_2$)$_{n1}$CH$_3$)((CH$_2$)$_{n2}$CH$_3$) wherein n$_1$ and n$_2$=0-6, —NHC(=S)SH, —CH$_2$C(=O)OC(CH$_3$)$_3$, —O(CH$_2$)$_n$CH(NH$_2$)COOH wherein n=1-6, —(CH$_2$)$_n$CH=CH$_2$ wherein n=1-6, —(CH$_2$)$_n$CH$_2$CN wherein n=1-6, an aromatic group such as phenyl, benzyl, phenoxy, methylbenzyl, nitrogen-substituted benzyl, nitrogen-substituted phenyl, a halide, or a halide-substituted methyl group; and wherein AN is counter anion selected from OH—, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$.

iii) wherein the composition is suitable for use in a membrane electrode assembly (MEA).

BRIEF DESCRIPTION OF THE FIGURES

FIG. 1 shows polarization curves of AMFC electrodes prepared from Example 5 and Comparative Example 3; the polarization curves were obtained at 60° C. under H$_2$/O$_2$ conditions.

DETAILED DESCRIPTION OF THE INVENTION

The present invention relates to solid anion exchange polymer electrolytes, their dispersion in liquid media, and to membranes and membrane electrode assemblies comprising the solid anion exchange polymer electrolytes, in which the solid anion exchange polymer electrolyte is a chemical compound comprising a polymer and guanidiniums attached to the polymer with cation-stabilizing spacers A. The compound may be represented by the following structure:

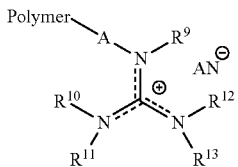

wherein
i) A is a cation-stabilizing spacer positioned between the polymer main chain and the guanidine base, having the having the structure —O—, —S—, —SO$_2$—, —NH—, —N(CH$_3$)—, —(CH$_2$)$_n$— wherein n=1-10,

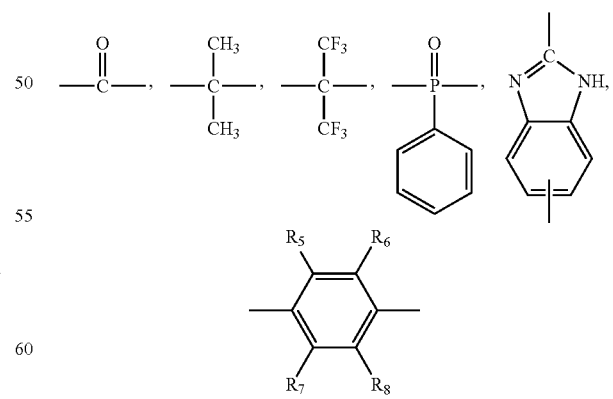

wherein R$_5$, R$_6$, R$_7$ and R$_8$ each are independently —H, —NH$_2$, —F, —Cl, —Br, —CN, a C$_1$-C$_6$ alkyl group, or any combination of thereof such as —SO$_2$—Ar—, —C(=O)Ar—, —SO$_2$—NH—, —C(=O)NHAr—, —C(=O)N(CH₃)Ar—, —SO₂—NH—SO₂—. When spacer A is benzimidazole, the bond bisecting the 3,4-double bond indicates that the spacer may be linked through any of positions 2, 3, 4, and 5.

ii) $R_9$, $R_{10}$, $R_{11}$, $R_{12}$ and $R_{13}$ each independently may be —H, —CH₃, —NH₂, —N(=O), —NO₂, —CN, —CH$_n$CH₃ where n=1-6, HC(=O)—, CH₃C(=O)—, NH₂C(=O)—, —(CH)$_n$COOH wherein n=1-6, —(CH₂)$_n$C(NH₂)COOH wherein n=1-6, —CH(COOH)CH₂COOH, —CH₂CH(OCH₂CH₃)₂, —C(=S)NH₂, C(=NH)N((CH₂)$_{n1}$CH₃)((CH₂)$_{n2}$CH₃) wherein $n_1$ and $n_2$=0-6, —NHC(=S)SH, —CH₂C(=O)OC(CH₃)₃, —O(CH₂)$_n$CH(NH₂)—COOH wherein n=1-6, —(CH₂)$_n$CH=CH wherein n=1-6, —(CH₂)$_n$CHCN wherein n=1-6, an aromatic group such as a phenyl, benzyl, phenoxy, methylbenzyl, nitrogen-substituted benzyl or phenyl groups, a halide, halide-substituted methyl group and/or $R_{10}$, $R_{11}$, $R_{12}$ and $R_{13}$ each independently or together form a heterocyclic group such as imide, imidazole, pyrazole, or benzimidazole groups. In the formula, AN⁻ refers to counter anions that balance the charge from the terminal guanidinium cations in the side chains. Examples including heterocyclic groups have the following formulas:

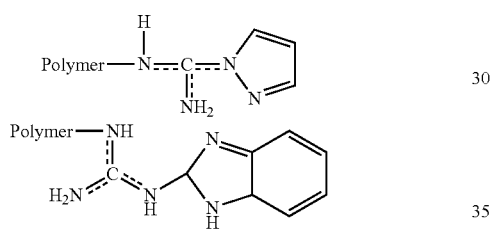

In an alternative embodiment, at least one of $R_9$, $R_{10}$, $R_{11}$, $R_{12}$ and $R_{13}$ is hydrogen, and the non-hydrogen groups each independently may be a non-cyclic heteroatomic group comprising nitrogen, oxygen, sulfur or a halide (X), wherein X is selected from the group consisting of fluoride, bromide, chloride or iodide. In one embodiment, $R_9$, $R_{10}$, $R_{11}$, $R_{12}$ and $R_{13}$ all are hydrogen. Hydrogenated guanidine has the advantage of superior stability in anion exchange polymer electrolytes. In an alternative embodiment, $R_9$, $R_{10}$, $R_{11}$, $R_{12}$, and $R_{13}$ all are —CH₃.

According to an embodiment of the present invention, a core structure of solid anion exchange polymer electrolytes is provided of the formula:

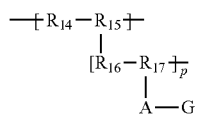

wherein:
i) p=1-100;
ii) $R_{14}$=CF₂ and $R_{15}$=CF; or $R_{14}$=CF₂ and $R_{15}$=CH; or $R_{14}$=CH₂ and $R_{15}$=CF; or $R_{14}$=CHF and $R_{15}$=CF; or $R_{14}$=CHF and $R_{15}$=CH;
iii) $R_{16}$ is CH₂ or CF₂ or CHF;
iv) $R_{17}$ is CH or CF;
v) A is a spacer selected from —O—, —S—, —SO₂—, —NH—, —N(CH₃)—, —(CH₂)— wherein n=1-10,

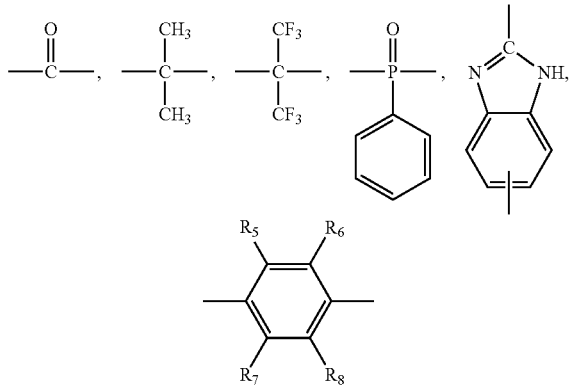

wherein $R_5$, $R_6$, $R_7$ and $R_8$ each are independently selected from —H, —NH₂, —F, —Cl, —Br, —CN, a $C_1$-$C_6$ alkyl group, or any combination of thereof such as —SO₂—Ar—, —C(=O)Ar—, —SO₂—NH—, —C(=O)NH—Ar—, —C(=O)N(CH₃)—Ar—, —SO₂—NH—SO₂—;

vi) G is

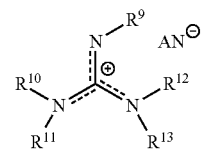

wherein $R_9$, $R_{10}$, $R_{11}$, $R_{12}$, and $R_{13}$ are each independently are selected from —H, —CH₃, —NH₂, —N(=O), —NO₂, —CN, —(CH)$_n$CH₃ wherein n=1-6, HC(=O)—, CH₃C(=O)—, NH₂C(=O)—, —(CH₂)$_n$COOH wherein n=1-6, —(CH₂)$_n$C(NH₂)COOH wherein n=1-6, —CH(COOH)CH₂COOH, —CH₂CH(O—CH₂CH₃)₂, —C(=S)NH₂, —C(=NH)N[(CH₂)$_{n1}$CH₃][(CH₂)$_{n2}$CH₃] wherein $n_1$ and $n_2$=0-6, —NHC(=S)SH, —CH₂C(=O)OC(CH₃)₃, —O(CH₂)$_n$CH(NH₂)COOH wherein n=1-6, —(CH₂)$_n$CH=CH₂ wherein n=1-6, —(CH₂)$_n$CH₂CN where n=1-6, an aromatic group such as phenyl, benzyl, phenoxy, methylbenzyl, nitrogen-substituted benzyl, nitrogen-substituted phenyl, halide, or a halide-substituted methyl group and/or $R_{10}$, $R_{11}$, $R_{12}$ and $R_{13}$ each independently or together form a heterocyclic group such as imide, imidazole, pyrazole, or benzimizaole groups; wherein AN is counter anion that balance the charge from the guanidinium cations. Examples of counter anions include, but are not limited to, OH⁻, $CO_3^{2-}$, $HCO_3^-$, F⁻, Cl⁻, Br⁻, I⁻, $IO_3^-$, $SO_4^{2-}$, $HSO_3^-$, $H_2PO_4^-$, $NO_3^-$, $CH_3OSO_3^-$.

According to yet another embodiment of the present invention, the solid anion exchange polymer electrolytes having the following structure:

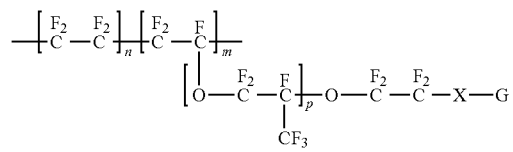

i) n and m are from 1-50 and p=0-10;
ii) A is a spacer selected from —O—, —S—, —SO$_2$—, —C(=O)—, —C(CH$_3$)$_2$—, —C(CF$_3$)$_2$—, —NH—, —N(CH$_3$)—, —(CH$_2$)$_n$— wherein n=1-10,

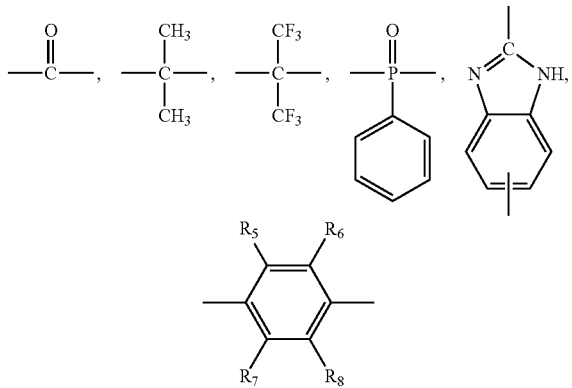

wherein R$_5$, R$_6$, R$_7$ and R$_8$ each are independently selected from —H, —NH$_2$, —F, —Cl, —Br, —CN, a C$_1$-C$_6$ alkyl group;
iii) A is a spacer selected from any combination from ii). For example, A may be a spacer of the formula —SO$_2$Ar—, —C(=O)Ar—, —C(=O)NHAr—, —C(=O)N(CH$_3$)Ar—, —SO$_2$—NH—, —SO$_2$—NH—SO$_2$—.
iv) G is

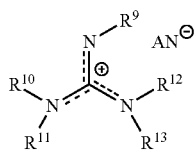

wherein R$_9$, R$_{10}$, R$_{11}$, R$_{12}$, and R$_{13}$ are each independently selected from —H, —CH$_3$, —NH$_2$, —N(=O), —NO$_2$, —CN, —(CH)$_n$CH$_3$ wherein n=1-6, HC(=O)—, CH$_3$C(=O)—, NH$_2$C(=O)—, —CH$_n$COOH wherein n=1-6, —(CH$_2$)$_n$C(NH$_2$)COOH where n=1-6, —CH(COOH)CH$_2$COOH, —CH$_2$CH(OCH$_2$CH$_3$)$_2$, —C(=S)—NH$_2$, —C(=NH)N((CH$_2$)$_{n1}$CH$_3$)((CH$_2$)$_{n2}$CH$_3$) wherein n$_1$ and n$_2$=0-6, —NHC(=S)SH, —CH$_2$C(=O)OC(CH$_3$)$_3$, —O(CH$_2$)$_n$CH(NH$_2$)COOH, wherein n=1-6, —(CH$_2$)$_n$CH=CH wherein n=1-6, —(CH$_2$)$_n$CH$_2$CN wherein n=1-6, an aromatic group such as phenyl, benzyl, phenoxy, methylbenzyl, nitrogen-substituted benzyl, nitrogen substituted phenyl, a halide, or a halide-substituted methyl group and/or R$_{10}$, R$_{11}$, R$_{12}$ and R$_{13}$ each independently or together form a heterocyclic group such as imide, imidazole, pyrazole, or benzimizaole groups; wherein the AN are counter anions that balance the charge of the guanidinium cations. Examples of these counter anions include, but are not limited to, OH—, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$, CH$_3$OSO$_3^-$.

In one embodiment, R$_9$, R$_{10}$, R$_{11}$, R$_{12}$ and R$_{13}$ all are hydrogen. In an alternative embodiment, R$_9$, R$_{10}$, R$_{11}$, R$_{12}$, and R$_{13}$ all are —CH$_3$. In one embodiment, A is —CO—Ar, where Ar is an aryl moiety. In another embodiment, R$_5$, R$_6$, R$_7$ and R$_8$ are hydrogen.

The fluorinated anion exchange polymer electrolytes comprising a guanidinium cation of the present invention are extremely stable, highly conductive, highly gas permeable and have good processibility compared to state of the art hydrocarbon based anion exchange polymer electrolytes comprising alkyl ammonium or guanidinium cation.

Without wishing to be limited by theory, the degradation of anion exchange polymer electrolytes occurs via elimination reaction (E2) or nucleophilic substitution (S$_N$2) reaction. E2 reactions can occur in cationic functional groups having β-hydrogens with a dihedral angle of 0 or 180°. The anion exchange polymer electrolytes comprising a guanidinium of the present invention do not have a β-hydrogen or a dihedral angle of 0 or 180°, which may greatly reduce the potential of E2 degradation. The rate of S$_N$2 reaction depends strongly on the basicity of the leaving group. In general, the weaker the basicity of the group (the higher the pKa), the greater its leaving ability. The pKa value of the guanidine base is three to five orders of magnitude higher than trialkyl amine, which suggests a much higher stability for guanidinium cation than alkylammonium cation. Another factor that affects the S$_N$2 reaction rate is the electron density of the cationic functional group. In the case of 1,4-diazabicyclo-octane (DABCO), the pKa value is lower than that of alkyl ammonium, however, the non-ionized nitrogen can donate its unpaired electrons to the ionized nitrogen, thus stabilizing the cationic group. Guanidinium also have high electron density and possible resonance structures, which greatly stabilize the functional group. The stability of the guanidinium can further be improved by introducing electron-donating (cation-stabilizing) spacer groups. Introducing electron-donating spacer groups allow utilizing fluorinated polymer systems which are hydrophobic and have high gas permeability. The anionic conductivity of the anion exchange polymer electrolytes of the present invention is excellent. The molecular volume of the guanidinium is relatively small compared with other highly bulky cation functionalities such as diaza(1,3)bicyclo[5.4.0]undecane (DBU), Verkade cation, and Schwesinger phosphazenium. The relatively small volume of the guanidinium can improve anionic conductivity. The higher conductivity as compared to alkylammonium functionalized anion exchange polymer electrolytes is likely due to its resonance structure, wherein the cation in the guanidinium is delocalized, which provides three ion exchange sites. The resonance structures provide not only stability but also good conductivity in that three nitrogen atoms participate in anionic conduction, whereas traditional alkylammonium cations have only a single nitrogen atom.

The anion exchange polymer electrolytes of the present invention also have excellent processibility. Unlike anion exchange polymer electrolytes, guanidinium-functionalized anion exchange polymer electrolytes can be synthesized via a neutral form and subsequently ionized. The neutral form (I) in Scheme 1 of the guanidine functionalized polymer electrolytes have relatively good solubility (or dispersibility) in aprotic solvents such as dimethylsulfoxide, dimethylformamide, and n-methyl m-pyrrolidone, and protic solvents such as glycerol, at elevated temperatures. The ionized form (II) is less soluble but still soluble (or dispersible) in a few aprotic solvents or in an aprotic solvent/alcohol mixture. The ability to disperse the polymer electrolyte in liquid mediums results in versatility and processibility. The good dispersion qualities of the anion exchange polymer electrolytes of the present invention allows the use of state of the art MEA processing methods of proton exchange membrane fuel cells, which are far advanced compared to those of alkaline anion exchange membrane fuel cells.

Scheme 1

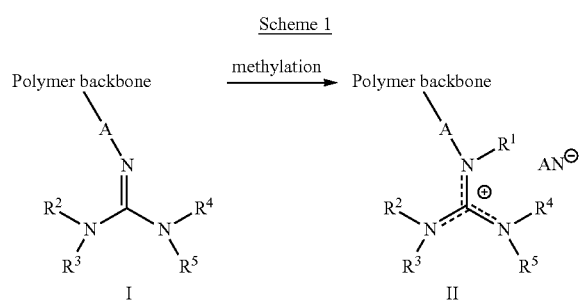

A: spacer
AN: anion counter ion

The present invention is related to polymers, anion conducting membranes, and polymer dispersions in liquid mediums. The functionalized anion exchange polymer electrolytes of the present invention can be synthesized from wholly perfluorinated and partially perfluorinated polymers followed by cation functionalization. Alternatively, synthesis may be performed by first functionalizing the monomers or spacers, followed by direct polymerization. Polymer modification has the advantages of being simpler and more economical whereas direct polymerization of the monomer has the advantage of allowing more precise control over the polymer architecture. Hereinafter, we provide non-limiting examples of the synthetic procedure and preparation methods to obtain the materials from polymer modification and direct polymerization from monomers that this invention claims.

Synthesis Using Bromo-Alkylated or Chloro-Alkylated Polymers.

The anion exchange polymer electrolytes of the present invention may be synthesized by the reaction of halogenated (Br, Cl, for example) polymers with a guanidine base (Scheme 2).

Scheme 2

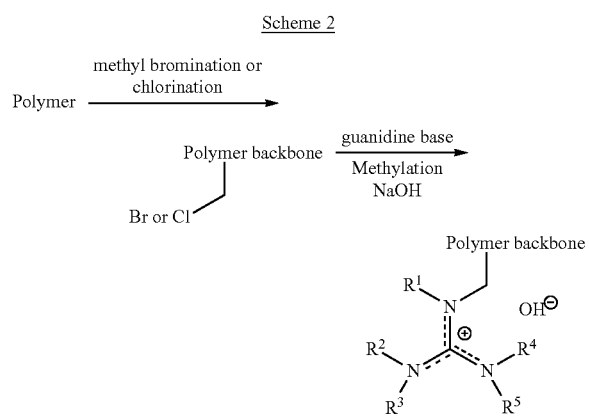

Synthesis Using Sulfonyl Halide Polymer Precursor.

The anion exchange polymer electrolytes of the present invention may be synthesized using the precursor to the perfluorinated sulfonic acid or partially fluorinated sulfonated polymers. Scheme 3 shows an example of a functionalized perfluorinated polymer comprising a guanidine base by using a known procedure such as a Grignard reaction. Here, the guanidinium cation is directly connected to a —CH$_2$ group.

Scheme 3

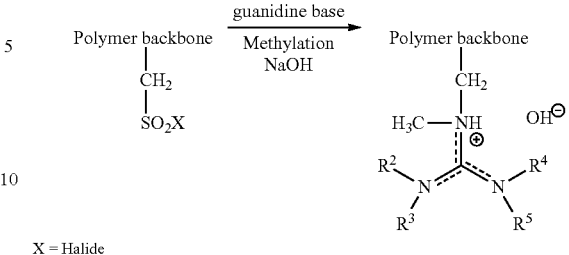

X = Halide

A more simple and economical method is via direct reaction of the sulfonyl fluoride or carboxylic acid with guanidine base. Scheme 4 shows an example of synthesizing guanidinium functionalized perfluorinated polymer:

Scheme 4

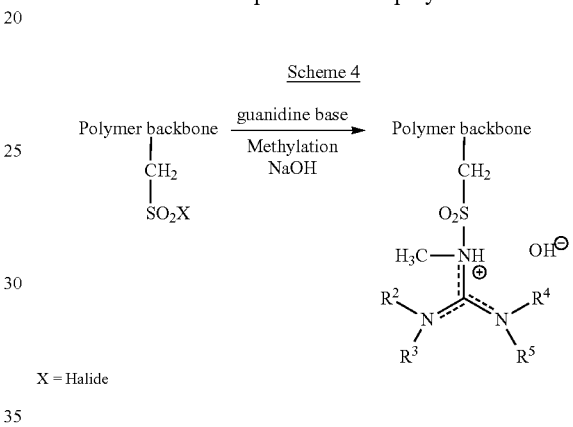

X = Halide

Synthesis using a spacer (post polymerization). The anion exchange polymer electrolytes of the present invention may be synthesized using the precursor such as perfluorinated sulfonyl fluoride or perfluorinated carboxylic acid and a spacer. Scheme 5 shows an example of a functionalized perfluorinated polymer comprising a spacer and guanidinium. Here, the guanidinium cation is connected to a spacer having one of the aforementioned structures.

Scheme 5

Polymer backbone —Spacer→ Polymer backbone —guanidine base, Methylation, NaOH→

F$_2$C—X       F$_2$C—Y—A

X = SO$_2$F, or COOH    Y = SO$_2$, or CO
                        A = Spacer

Polymer backbone
|
F$_2$C—Y—A
          \
           N—R$_1$
       R$^2$\\ⓘ/R$^4$
         N   N
        R$^3$  R$^5$
          OH$^-$ Synthesis using a spacer (direct polymerization). Functionalized polymer electrolytes also may be synthesized by the direct polymerization of functionalized spacer with a guanidine base, followed by the reaction of fluorinated polymer and the guanidine functionalized spacer, as shown in Scheme 6.

Scheme 6

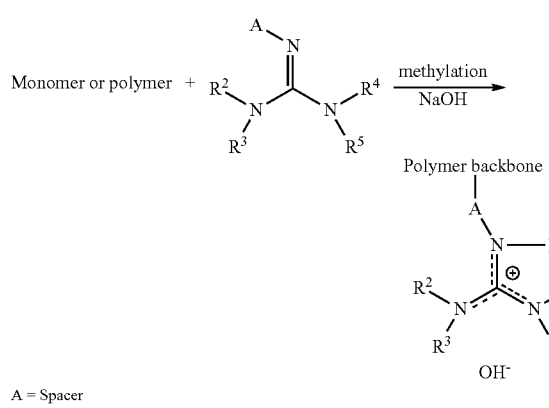

A = Spacer

As for the polymer structure which forms the anion-exchange polymer electrolytes of the finally obtained, in addition to the aforementioned compounds, other suitable compounds which would be known to one of skill in the art may be used. Engineering plastic-based, radiation grafted and fluorocarbon polymers may produce superior mechanical properties in anion exchange membranes. Perfluorinated polymers are preferred for electrode materials due to higher hydrophobicity, gas permeability and inertness to catalysts. Perfluorinated precursor polymers using direct reaction of the sulfonyl fluoride (or carboxylic acid) polymer with the guanidine functionalized spacer is more economical. The number of anion exchange groups of the polymer electrolytes is not particularly limited, however, in one embodiment an ion exchange capacity (IEC) of from about 0.1 meq/g to about 3.0 meq/g, and alternatively is from about 0.5 meq/g to about 2.0 meq/g, is preferred for superior conductivity and mechanical properties.

Membrane Preparation.

Guanidinium functionalized anion-exchange membranes can be prepared in a variety of methods that would be known to one of skill in the art, including solution casting, extrusion, blade method, spin coating, melt processing, etc. The thickness of the final polymer membrane of the present invention may be from about 5 μm to about 150 μm, and alternatively is from about 10 μm to 100 μm. The guanidinium functionalized polymer electrolytes can be used as filler in organic or inorganic substrates. When the guanidinium functionalized anion exchange polymer electrolytes are produced by impregnating a porous structure, the substrate may be any one of a variety of suitable substrates, such as woven fabric or unwoven fabric. Alternatively, a porous membrane may be used.

Dispersion Preparation.

The neutral and ionized forms of guanidinium functionalized polymers may be readily dissolved or dispersed in protic or aprotic solvents or dispersion media at ambient or elevated temperature. Some examples of suitable liquid media include water, ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, dimethylformamide (DMF), dimethylacetamide (DMAc), N-methylpyrrolidone (NMP), dimethylsulfoxide (DMSO), and combinations thereof. In one embodiment, the solvent is an aprotic solvent, which is advantageous because when a proton is donated in a protic solvent, this converts the neutral from to the ionized form, which is more difficult to dissolve or disperse in a liquid medium. In addition, hydrolysis may occurs in water-based protic solvents at high temperature processing (ca.>200° C.). Suitable aprotic solvents include dimethylformamide, dimethylacetamide, N-methylpyrrolidone, dimethylsulfoxide, and combinations thereof. In another embodiment, the solvent is an alcohol. Suitable alcohols include ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, and combinations thereof. In another embodiment, the solvent is mixture of aprotic solvent and alcohol solvent. A solvent mixture may have a benefit of increased solubility of the polymer electrolytes. The aprotic solvent can be selected from dimethylformamide, dimethylacetamide, N-methylpyrrolidone, dimethylsulfoxide and alcohol solvent can be selected from the group consisting of ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol.

The dispersion temperature is not particularly limited, and depends on the chemical structure of polymer backbone, spacer, and guanidinium cation and dispersion power of the liquid medium. In one embodiment the dispersion temperature of ambient temperature, and alternatively is below the boiling temperature of the liquid media is preferred. Agitation, stirring, sonication or shaking of the dispersion can be applied during the dispersion process in order to reduce the dispersion temperature.

The concentration of the polymer electrolytes in the liquid medium is not particularly limited, and depends on a variety of factors that would be known to one of skill in the art, such as the type of solvent, the amounts used in the electrode catalyst, viscosity, permeability, etc. In one embodiment, the concentration of the polymer electrolytes is from about 0.1% to about 20%, and alternatively is from about 0.5% to 10%, wherein the % represents the weight of the polymer electrolytes as a percentage of the weight of the composition.

Membrane Electrode Assembly (MEA) Preparation

A further aspect of the present invention provides a MEA comprising the guanidinium functionalized polymer membrane and dispersion according to the present invention and a method for preparing such a MEA.

A catalyst ink can be made from the polymer electrolyte dispersion and catalyst. The term "catalyst" will be well understood by a person skilled in the art by meaning a catalyst that when incorporated into the electrode, facilitates an electrochemical reaction. For example, the catalyst may be selected from platinum, palladium, rhodium, ruthenium, iridium, iron, cerium, titanium, vanadium, osmium, gold, silver, nickel, cobalt, manganese, or alternatively may be a base metal or base metal oxide, pyrolyzed (or unpyrolyzed) macrocycles, spinel, pyrochlores, perovskite-type oxides, or an alloy or mixture comprising one or more of these metals preferably supported on a conductive substrate, such as carbon. Various from of carbon such as particulate carbon, carbon nanotubes, nanotube/perovskite composites can be used as electrode materials.

The polymer electrolyte dispersion is typically prepared by dispersing the anion exchange membrane which can be processed to make electrodes, which in turn allow fabrication of durable membrane electrode assemblies (MEAs) by using fabrication methods described, e.g., in U.S. Pat. No. 5,998, 057 (Koschany et al.) and U.S. Patent Application 2010/0183804 (Kim et al.). Other known method such as direct painting of catalyst ink onto a membrane, decal transfer, spray painting, screen printing, roll coating, hot pressing etc. as would be known to one of skill in the art also may be used. Using these fabrication methods, a highly stable and durable interface between the membrane and electrode can be obtained without using a cross-linking reaction.

EXAMPLES

The following describe some non-limiting examples which represent various embodiments of the present invention. In all examples, "equivalent weight," (EW) means molecular weight per cation, i.e., the reciprocal value of the anion exchange capacity of a polymer, and is understood to mean the weight of the polymer in cation form required to neutralize one equivalent of HCl. Examples 1 to 4 describe the synthesis of guanidinium functionalized perfluorinated anion exchange polymer electrolytes having stabilizing spacer.

Example 1

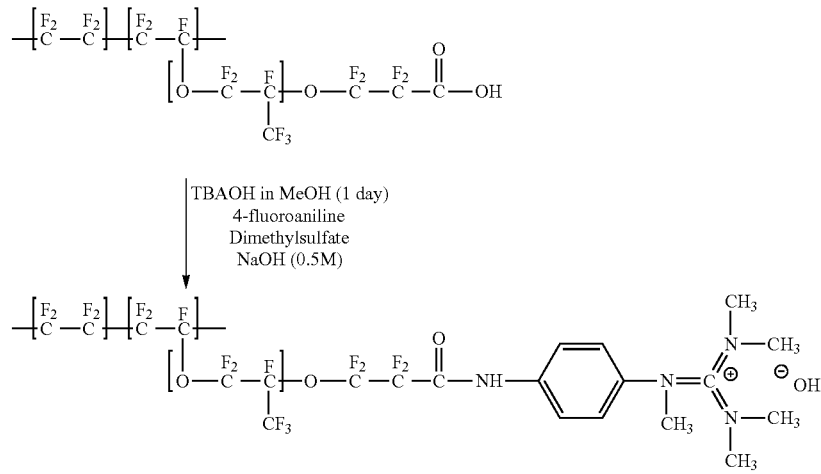

The reaction for Example 1 is summarized in the equation above. The perfluorinated polymer precursor (film thickness: 25 μm, carboxylic acid form, EW1100) having the formula shown in the equation above was treated with tetrabutylammonium hydroxide (TBAOH) solution at room temperature for 24 hr. The perfluorinated polymer precursor (TBA+ form) was treated with 4-fluoroaniline in dimethylformamide (DMF) solution at 130° C. for 24 hr. The result polymer was treated with 1,1,3,3-tetramethylguanidine in dimethylformamide (DMF) solution at 130° C. for 12 hours. The polymer was dried under a vacuum oven at 75° C. after the polymer was washed with pure water at boiling temperature.

Tetramethlguanidine functionalized perfluorinated polymers were further treated with dimethyl sulfate (DMS) in DMF at 90° C. for 24 hr. Guanidinium functionalized perfluorinated polymer was obtained. Guanidinium functionalized perfluorinated polymers was further treated with 0.5 M NaOH followed by washing with water.

Example 2

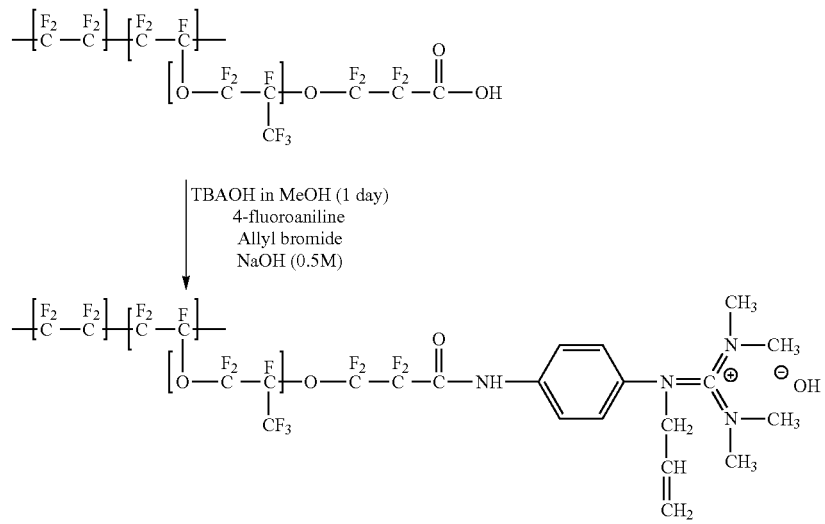

The reaction for Example 2 is summarized in the equation above. The perfluorinated polymer precursor (film thickness: 25 μm, carboxylic acid form, EW1100) shown above was treated with tetrabutylammonium hydroxide (TBAOH) solution at room temperature for 24 hours. The perfluorinated polymer precursor (TBA+ form) was treated with 4-fluoroaniline in dimethylformamide (DMF) solution at 130° C. for 24 hr. The result polymer was treated with 1,1,3,3-tetramethylguanidine in dimethylformamide (DMF) solution at 130° C. for 12 hr. The polymer washed with water at a boiling temperature and then dried under a vacuum oven at 75° C.

Tetramethylguanidine functionalized perfluorinated polymer was further treated with allyl bromide in DMF at 90° C. for 24 hours. Functionalized perfluorinated polymer was obtained. Guanidinium functionalized perfluorinated polymers was further treated with 0.5 M NaOH followed by washing with water.

Example 3

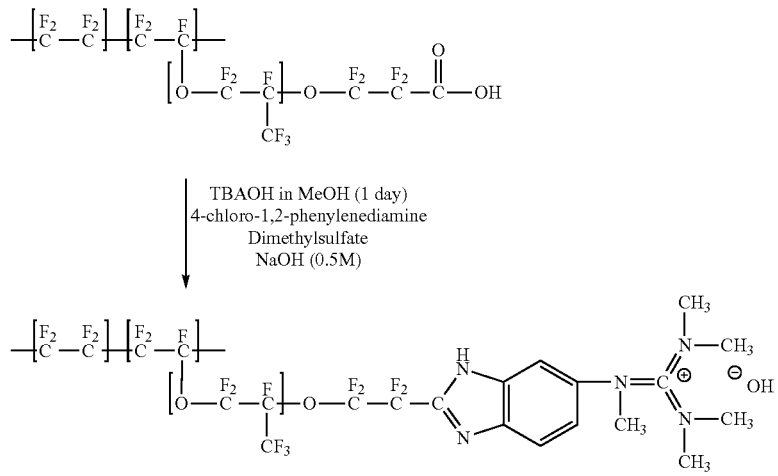

Example 3 is summarized by the equation above. The perfluorinated polymer precursor (film thickness: 25 μm, carboxylic acid form, EW1100) shown n the equation above was treated with tetrabutylammonium hydroxide (TBAOH) solution at room temperature for 24 hours. The perfluorinated polymer precursor (TBA+ form) was treated with 4-chloro-1,2-phenylenediamine, triphenylphosphite, and LiCl in dimethylformamide (DMF) solution at 100° C. for 5 hr and 130° C. for 24 hr. The result polymer was treated with 1,1,3,3-tetramethylguanidine in dimethylformamide (DMF) solution at 130° C. for 12 hours. The polymer was washed with water at a boiling temperature and then dried under a vacuum oven at 75° C.

Tetramethlguanidine functionalized perfluorinated polymers were further treated with dimethyl sulfate (DMS) in DMF at 90° C. for 24 hr. Functionalized perfluorinated polymer was obtained. Guanidine functionalized perfluorinated polymers was further treated with 0.5 M NaOH followed by washing with water.

Example 4

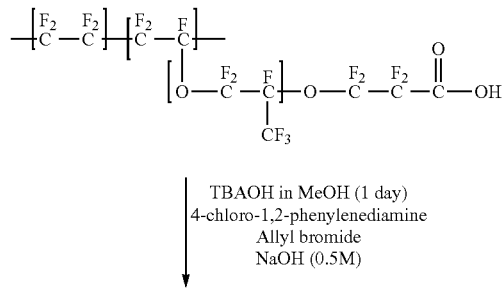

-continued

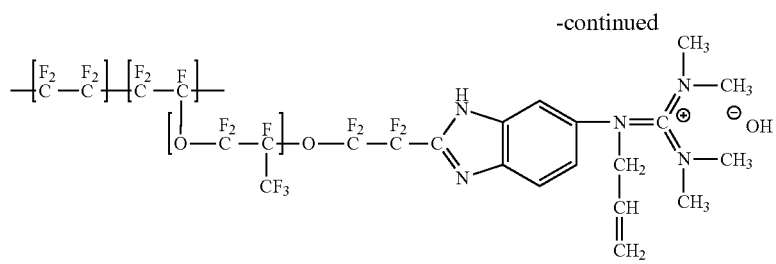

A perfluorinated polymer precursor (film thickness: 25 μm, carboxylic acid form, EW1100) was treated with tetrabutylammonium hydroxide (TBAOH) solution at room temperature for 24 hr. The perfluorinated polymer precursor (TBA+ form) was treated with 4-chloro-1,2-phenylenediamine, triphenylphosphite, and LiCl in dimethylformamide (DMF) solution at 100° C. for 5 hr and 130° C. for 24 hr. The result polymer was treated with 1,1,3,3-tetramethylguanidine in dimethylformamide (DMF) solution at 130° C. for 12 hr. The polymer was washed with water at boiling temperature and then dried under a vacuum oven at 75° C.

Tetramethylguanidine functionalized perfluorinated polymer was further treated with allyl bromide in DMF at 90° C. for 24 hr. Functionalized perfluorinated polymer was obtained. Guanidinium functionalized perfluorinated polymers was further treated with 0.5 M NaOH followed by washing with water.

Comparative Example 1

Synthesis of Guanidinium Functionalized Perfluorinated Anion Exchange Polymer Electrolytes without Stabilizing Spacer A perfluorinated polymer precursor (film thickness: 25 μm, sulfonyl fluoride form, EW1100) was treated with 1,1,3,3-tetramethylguanidine in dimethylformamide (DMF) solution at 90° C. for 24 hr. After washing with water, the membrane was dried under a vacuum plate at 75° C. The absorption by C=N was observed at 1525-1580 cm$^{-1}$ by FT-IR, and C=N and N—CH$_3$ peak was observed at 162 and 39.5 ppm by C-NMR, respectively. Tetramethlguanidine functionalized perfluorinated polymers were further treated with dimethyl sulfate (DMS) in DMF at 90° C. for 24 hr. Pentamethylguanidine functionalized perfluorinated polymer was obtained. Guanidine functionalized perfluorinated polymers were further treated with 1 M NaOH for 4 hr at boiling temperature followed by washing with water.

Comparative Example 2

Synthesis of Other Cation Functionalized Anion Exchange Membranes

Trimethylamine, triethylamine and 1,4-diazabicyclo-[2,2,2]-octane (DABCO) functionalized anion exchange polymer electrolytes were prepared. The C peak of —CH$_3$ and —CH$_2$N in triethylamine were observed at 9 and 45 ppm by $^{13}$C NMR, respectively. The C peak of CH$_2$N in DABCO was observed at 45 ppm by $^{13}$C NMR. However after soaking these membranes in 1 M NaOH for 10 hr, membrane degradation was observed.

Table 1, below, shows the hydrolytic stability in 1 M NaOH of Examples 1-11 and Comparative Example 1 and 2.

TABLE 1

Hydrolytic stability of perfluorinated and hydrocarbon based anion exchange polymer electrolytes.

| Example | Polymer Backbone | Functional group | Stability test[a] | Conductivity (mS/cm) | Solubility[c] |
|---|---|---|---|---|---|
| Example 1 | Perfluorinated | Functionalized guanidine with stabilizing spacer | Stable | 20 | ○ |
| Example 2 | | | Stable | NA[b] | ○ |
| Example 3 | | | Stable | NA | ○ |
| Example 4 | | | Stable | NA | ○ |
| Comparative Example 1 | | Functionalized guanidine without stabilizing spacer | S$_N$2 Hydrolysis | 37 | ○ |
| Comparative Example 2 | | Trimethyl amine | S$_N$2 Hydrolysis | NA | X |
| | | Triethyl amine | S$_N$2 Hydrolysis | NA | X |
| | | DABCO | S$_N$2 Hydrolysis | NA | X |

[a]Test condition: After soaking in 1M NaOH for 10 h at room temperature,
[b]NA: not available,
[c]soluble in organic solvent (DMF, NMP, DMAc, DMSO) before methylation (○ = soluble in an organic solvent, e.g., as described herein; X = insoluble.)

Example 5 and Comparative Example 3 explain the MEA processing. Guanidinium functionalized perfluorinated ionomer was used for electrode ionomer materials in Example 5 and tetra alkyl ammonium functionalized hydrocarbon ionomer was used for electrode ionomer materials in the comparative Example 3 Fuel cell electrodes were prepared using commercially available platinum black catalysts (Johnson Matthey) and tetraalkylammonium functionalized poly(phenylene) membranes (thickness=70 µm). The electrode performance prepared from Example 5 and Comparative Example 3 was compared.

Example 5

Guanidinium functionalized perfluorinated polymer prepared from Example 1 was dispersed in NMP: Glycerol (1:1 wt., 1.5 wt. %). Platinum black catalyst was added in the dispersion and thoroughly stirred for at least 12 h. The catalyst ink was painted onto membrane and dried at 75° C. until the catalyst loading is reached to 3 mg/cm$^2$. The MEA was immersed into 0.5 M NaOH solution for 1 h, following the washing with water at 80° C. for several times. Initial polarization curves were obtained after 10 hours of break-in.

Comparative Example 3

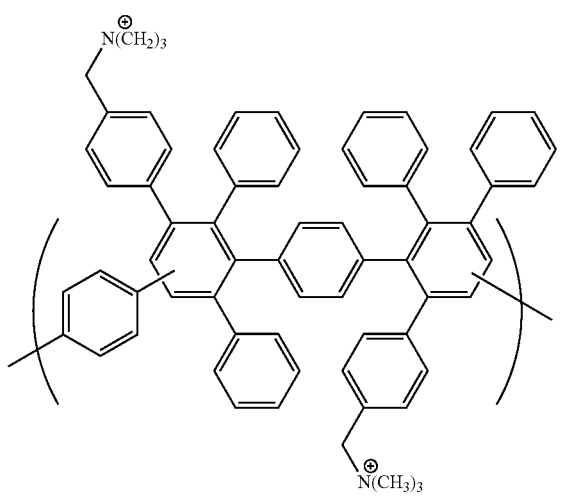

Tetraalkylammonium functionalized poly(phenylene)

Tetraalkylammonium functionalized polymer was dispersed in NMP: Glycerol (1:1 wt, 1.5 wt. %). Platinum black catalyst was added in the dispersion and thoroughly stirred for at least 12 h. The catalyst ink was painted onto membrane and dried at 75° C. until the catalyst loading is reached to 3 mg/cm$^2$. The MEA was immersed into 0.5M NaOH solution for 1 h, following the washing with water at 80° C. for several times. Initial polarization curves were obtained after 10 h break-in.

FIG. 1 showed the polarization curves of AMFC membrane electrode assembly (MEA) prepared from Example 5 and Comparative Example 3. The MEA using guanidinium functionalized polymer (Example 5) as the electrode binder produced much greater currents than the MEA using tetraalkylammonium functionalized polymer (Comparative Example 3) (e.g. 690 mA/cm$^2$ vs. 164 mA/cm$^2$ at 0.5V). FIG. 1 clearly shows the benefit of using fluorinated guanidinium functionalized anion exchange polymers from this invention as compared to hydrocarbon based tetra-alkyl ammonium functionalized polymers.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid anion exchange polymer electrolyte comprising the structure

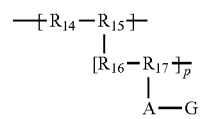

wherein
i) p=1-100;
ii) $R_{14}$=CF$_2$ and $R_{15}$=CF; or $R_{14}$=CF$_2$ and $R_{15}$=CH; or $R_{14}$=CH$_2$ and $R_{15}$=CF; or $R_{14}$=CHF and $R_{15}$=CF; or $R_{14}$=CHF and $R_{15}$=CH;
iii) $R_{16}$ is CH$_2$ or CF$_2$ or CHF;
iv) $R_{17}$ is CH or CF;
v) A is a spacer selected from —O—, —S—, —SO$_2$—, —NH—, —N(CH$_3$)—, —(CH$_2$)$_n$— wherein n=1-10,

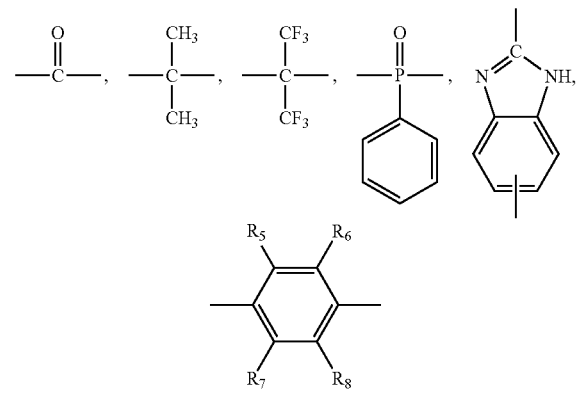

wherein $R_5$, $R_6$, $R_7$ and $R_8$ each are independently selected from —H, —NH$_2$, —F, —Cl, —Br, —CN, a $C_1$-$C_6$ alkyl group, or any combination thereof;
vi) G is

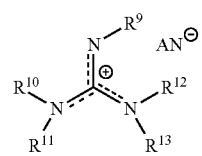

wherein $R_9$, $R_{10}$, $R_{11}$, $R_{12}$, and $R_{13}$ are each independently are selected from —H, —CH$_3$, —NH$_2$, —N(=O), —NO$_2$, —CN, —(CH)$_n$CH$_3$ wherein n=1-6, HC(=O)—, CH$_3$C(=O)—, NH$_2$, —N(=O)—, —(CH$_2$)$_n$COOH wherein n=1-6, —(CH$_2$)$_n$C(NH$_2$)COOH wherein n=1-6, =CH(COOH)CH$_2$COOH, —CH$_2$CH(O—CH$_2$CH$_3$)$_2$, —C(=S)NH$_2$, —C(=NH)N((CH$_2$)$_{n1}$CH$_3$)((CH$_2$)$_{n2}$CH$_3$) wherein n1 and n2=0-6, —NHC(=S)SH, —CH$_2$C(=O)OC(CH$_3$)$_3$, —O(CH$_2$)$_n$CH(NH$_2$)COOH wherein n=1-6, —(CH$_2$)$_n$CH=CH$_2$ wherein n=1-6, —(CH$_2$)$_n$CH$_2$CN where n=1-6, an aromatic group selected from phenyl, benzyl, phenoxy, methylbenzyl, nitrogen-substituted benzyl, nitrogen-substituted phenyl, halide, or a halide-substituted methyl group, and wherein R$_{10}$, R$_{11}$, R$_{12}$ and R$_{13}$ each independently or together may form a heterocyclic group selected from imide, imidazole, pyrazole, or benzimizaole group wherein AN is counter anion selected from OH—, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$, and CH$_3$OSO$_3^-$.

2. The solid anion exchange polymer electrolyte of claim 1, wherein A is a spacer selected from —SO$_2$—Ar—, —C(=O)Ar—, —C(=O)NHAr—, —C(=O)N(CH$_3$)Ar—, —SO$_2$—NH—, and —SO$_2$—NH—SO$_2$— where Ar is an aryl moiety.

3. The solid anion exchange polymer electrolyte of claim 1, wherein R$_{14}$ and R$_{16}$ are CF$_2$ and R$_{15}$ and R$_{17}$ is CF.

4. The solid anion exchange polymer electrolyte of claim 1, wherein R$_5$, R$_6$, R$_7$ and R$_8$ are H.

5. The solid anion exchange polymer electrolyte of claim 1, wherein R$_9$, R$_{10}$, R$_{11}$, R$_{12}$, or R$_{13}$ are CH$_3$.

6. A solid anion exchange polymer electrolyte comprising the structure:

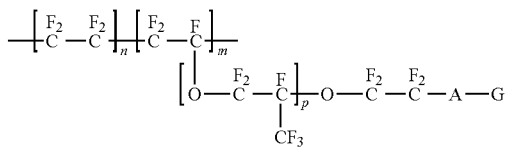

wherein
i) n and m are from 1-50 and p=0-10;
ii) A is a spacer selected from —O—, —S—, —SO$_2$—, —N(CH$_3$)—, —(CH$_2$)$_n$— wherein n=1-10,

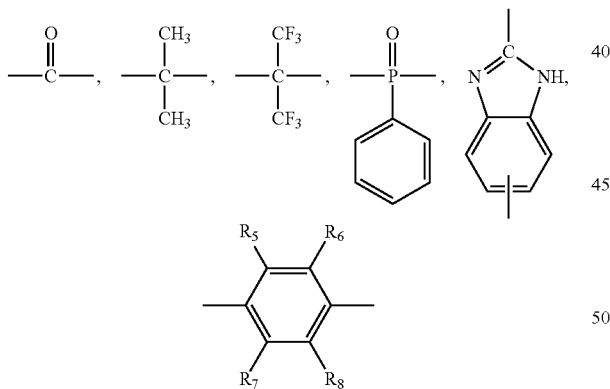

wherein R$_5$, R$_6$, R$_7$ and R$_8$ each are independently selected from —H, —NH$_2$, —F, —Cl, —Br, —CN, a C$_1$-C$_6$ alkyl group, or any combination thereof,
iii) G is

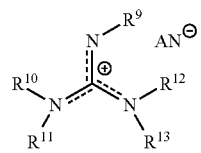

wherein R$_9$, R$_{10}$, R$_{11}$, R$_{12}$, and R$_{13}$ are each independently selected from —H, —CH$_3$, —N$_2$, —N(=O), NO$_2$, —CN, —(CH)$_n$CH$_3$ wherein n=1-6, HC(=O)—, CH$_3$C(=O)—, NH$_2$C(=O)—, —(CH$_2$)$_n$COOH wherein n=1-6, —(CH$_2$)$_n$C(NH$_2$)COOH where n=1-6, —CH(COOH)CH$_2$COOH, —CH$_2$CH(OCH$_2$CH$_3$)$_2$, —C(=S)—NH$_2$, C(=NH)N((CH$_2$)$_{n1}$CH$_3$((CH$_2$)$_{n2}$CH$_3$) wherein n=0-6 and n$_2$=0-6, —NHC(=S)SH, —CH$_2$C(=O)OC(CH$_3$)$_3$, —O(CH$_2$)$_n$CH(NH$_2$)COOH, wherein n=1-6, —(CH$_2$)$_n$CH=CH wherein n=1-6, —(CH$_2$)$_n$CH$_2$CN wherein n=1-6, an aromatic group selected from phenyl, benzyl, phenoxy, methylbenzyl, nitrogen-substituted benzyl, nitrogen substituted phenyl, a halide, or a halide-substituted methyl group, and wherein R$_{10}$, R$_{11}$, R$_{12}$ and R$_{13}$ each independently or together may form a heterocyclic group selected from imide, imidazole, pyrazole, or benzimizaole groups; wherein AN is counter anion selected from OH—, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$, and CH$_3$OSO$_3^-$.

7. The solid anion exchange polymer electrolyte of claim 6, wherein A is a spacer selected from —SO$_2$—Ar—, —C(=O)Ar—, —SO$_2$—NH—, and —SO$_2$—NH—SO$_2$.

8. The solid anion exchange polymer electrolyte of claim 6, wherein R$_5$, R$_6$, R$_7$ and R$_8$ are H.

9. The solid anion exchange polymer electrolyte of claim 6, wherein R$_9$, R$_{10}$, R$_{11}$, R$_{12}$, and R$_{13}$ are CH$_3$.

10. A composition suitable for a membrane electrode assembly, said composition comprising a polymer, cationic residues comprised of guanidinium cations, and spacers A for attaching the guanidiniums to the polymer, the composition having the formula:

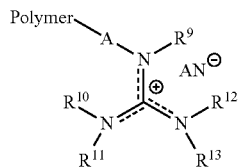

wherein:
i) A is a spacer selected from —O—, —S—, —SO$_2$—, —NH—, —N(CH$_3$)—, —(CH$_2$)$_n$— wherein n=1-10,

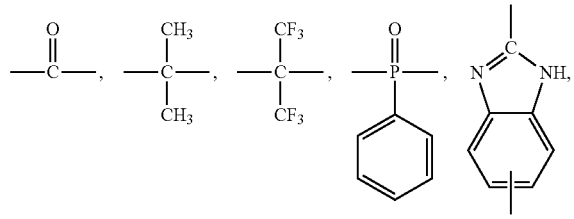

or any combination thereof, wherein R$_5$, R$_6$, R$_7$ and R$_8$ each are independently selected from —H, —NH$_2$, —F, —Cl, —Br, —CN, or a C$_1$-C$_6$ alkyl group;
ii) R$_9$, R$_{10}$, R$_{11}$, R$_{12}$, and R$_{13}$ are each independently selected from —H, —CH$_3$, —NH$_2$, —N(=O), —NO$_2$, —CN, —(CH)CH$_3$ wherein n=1-6, HC(=O)—, CH$_3$C(=O)—, NH$_2$C(=O)—, —(CH$_2$)$_n$COOH wherein n=1-6, —(CH$_2$)$_n$C(NH$_2$)COOH wherein n=1-6, —CH(COOH)CH$_2$COOH, —CH$_2$CH(OCH$_2$CH$_3$)$_2$, —C(=S)NH$_2$, C(=NH)N((CH$_2$)$_{n1}$CH$_3$)((CH$_2$)$_{n2}$CH$_3$) wherein n$_1$ and n$_2$=0-6, —NHC(=S)SH, —CH$_2$C(=O)OC(CH$_3$)$_3$, —O(CH$_2$)$_n$CH(NH$_2$)COOH wherein n=1-6, —(CH$_2$)$_n$CH=CH$_2$ wherein n=1-6, —(CH$_2$)$_n$CH$_2$CN wherein n=1-6, an aromatic group such as phenyl, benzyl, phenoxy, methylbenzyl, nitrogen-substituted benzyl, nitrogen-substituted phenyl, a halide, or a halide-substituted methyl group; and where in AN is counter anion selected from OH—, CO$_3^{2-}$, HCO$_3^-$, F$^-$, Cl$^-$, Br$^-$, I$^-$, IO$_3^-$, SO$_4^{2-}$, HSO$_3^-$, H$_2$PO$_4^-$, NO$_3^-$, and CH$_3$OSO$_3^-$.

11. The solid anion exchange polymer electrolyte of claim 10, wherein A is a spacer selected from —SO$_2$—Ar—, —C(=O)Ar—, —C(=O)N(CH$_3$)Ar—, —C(=O)N(CH$_3$)Ar—, —SO$_2$—NH—, and —SO$_2$—NH—SO$_2$ where Ar is an aryl moiety.

12. The composition of claim 10, wherein R$_9$, R$_{10}$, R$_{11}$, R$_{12}$, or R$_{13}$ are CH$_3$.

13. The composition of claim 10, wherein the solvent is selected from an aprotic solvent, an alcohol, or mixtures thereof.

14. The composition of claim 13, wherein the aprotic solvent is selected from dimethylformamide, dimethylacetamide, N-methylpyrrolidone, dimethylsulfoxide, and combinations thereof.

15. The composition of claim 13, wherein the alcohol is selected from ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, and combinations thereof.

16. The composition of claim 10, wherein the composition further comprises a catalyst.

* * * * *